United States Patent Office 3,468,930
Patented Sept. 23, 1969

3,468,930
PROCESS FOR THE CONVERSION OF NITRILES TO ESTERS
Joseph Pugach, Bronx, N.Y., assignor to Halcon International, Inc., a corporation of Delaware
No Drawing. Filed Aug. 4, 1966, Ser. No. 570,181
Int. Cl. C07c 67/00
U.S. Cl. 260—475                             9 Claims

ABSTRACT OF THE DISCLOSURE

The present invention is concerned with the production of esters of aromatic carboxylic acids through the reaction in the liquid phase of an aromatic nitrile and a lower aliphatic polyhydric alcohol, the improvement comprising carrying out the reaction in the presence of an iron or tin catalyst.

---

The present invention relates to the production of esters and in particular to the conversion of nitriles to esters.

Methods have been advanced for the production of nitriles from esters by reacting an organic nitrile such as an aromatic nitrile with a polyhydric alcohol and water, preferably in the liquid phase with the evolution of ammonia and the formation of an ester of an organic carboxylic acid. In this regard, particular reference is made to U.S. Patent 2,921,088 which describes in detail the general reaction and the various reactants which can be employed.

A disadvantage of such prior techniques has been the fact that complete conversions have not been readily obtained. For example, at column 3, lines 21 through 27 of the said patent, it is stated that the reaction slows down considerably short of complete conversion and that the preferable procedure for operation involves the use of only partial conversion with recovery and recycle of the unreacted components.

Obviously, it is desirable to provide means for conveniently achieving high conversions at high selectivity levels in this reacton. The use of such high conversions has the distinct advantage of avoiding the cost and inefficiencies inherent in the partial conversion and recycle technology.

It is an object of the present invention to provide an improved process for the production of esters from organic nitriles.

It is a particular object to provide an improvement in the production of organic esters from organic nitriles whereby high conversions at high selectivities can be readily obtained. Other objects will be apparent from the following description of the invention.

The general reaction involved in the present invention and the reactants and conditions are those which are set forth in detail in U.S. Patent 2,921,088. The present invention relates to the discovery that by the use of a suitable catalyst, the esterification reaction can be carried substantially to completion while retaining high reaction selectivities. In particular, it has been discovered that through the provision of an iron, tin or lead catalyst, the esterification reaction will rapidly proceed substantially to completion thus obviating the necessity for incomplete conversions and the recycle of nonreacted components. Of course, if desired, the process of this invention can be run only to a partial conversion level and the advantages in such operation of a speedier reaction are achieved. However, in its most preferred aspect, the esterification is run substantially to completion.

The catalyst is preferably employed in the form of a compound of iron, tin or lead. The following are illustrative of specific compounds which can be employed in the invention, but the catalysts are not limited to those specifically mentioned: basic ferric acetate, ferric oxide, ferric hydroxide, ferric nitrate, ferric formate, ferric lactate, ferric sulfate, ferric oxalate, ferrous acetate, ferrous oxide, ferrous chloride, ferrous carbonate, ferrous lactate, ferrous formate, iron carbonyl, iron acetylacetonate, iron naphthenate, stannic oxide, stannic phosphate, stannic sulfate, stannous chloride, stannous hydroxide, stannous acetate, stannous oxalate, stannous lactate, stannous laurate, stannous stearate, lead oxide, lead acetate, lead chloride, lead oxalate, lead linoleate, lead octoate, lead hydroxide, and the like. Naturally, the metals themselves can be charged to the process to form compounds in situ.

The catalyst is employed in effective catalytic amount, which amount usually is in the range of from 0.01 to 20 mol percent based on the nitrile reactant. A preferred range of concentration is from 0.5 to 2 mol percent based on nitrile.

The starting materials for the reaction are organic nitriles particularly aromatic nitriles and most preferably terephthalonitrile. The nitrile is reacted with polyhydric alcohols specifically including ethylene glycol, propylene glycol, and butylene glycols, also trihydric alcohols such as glycerol can be employed. The mol ratio of dihydric alcohol to nitrile is broadly about 2 to 1 to 50 to 1 with levels 5 to 1 to 10 to 1 being preferred.

As described in the U.S. Patent 2,921,088 it is preferred to carry out the reaction in the presence of at least the theoretical amount of water in order to facilitate the reaction.

Reaction temperatures ranging generally from 100° to 300° C. can be employed with temperatures of 170° C. to 250° C. being preferred. A particularly preferred method of carrying out the reaction includes passing a water saturated stream of nitrogen through the reaction mixture during the reaction. This facilitates removing evolved ammonia from the reaction.

The following examples will illustrate the practice of the invention and will also provide by means of comparisons illustrates of the important advantages which are achieved through use of the iron, tin or lead catalyst at contrasted with prior techniques:

Example 1

A reactor equipped with a water cooled reflux condenser is charged with 20 grams terephthalonitrile, 100 grams ethylene glycol, 6 grams of water and 0.3 gram of basic ferric acetate. The mixture is heated to reflux temperature and nitrogen saturated with water vapor is continuously passed through the mixture. Exit gases are bubbled through a scrubber containing 1 N HCl. The reflux temperature generally ranges from about 180° to about 190° C. After 11 hours 100% of the theoretical amount of ammonia is removed.

The reaction mixture is filtered at the reaction temperature to remove catalyst and upon cooling of the filtered product bis-hydroxy-ethyl terephthalate precipitates in crystalline form. Upon filtration, washing with cold water and drying, there is obtained 32 grams of product. The filtrate is distilled under reduced pressure to remove glycol and in this manner another 6 grams of product is obtained. The overall yield of product based on terephthalonitrile is 96%.

Example 2

Example 1 is repeated using 0.3 gram of ferrous chloride ($FeCl_2 \cdot 4H_2O$). After 11 hours 85% of the theoretical ammonia is removed, and a total yield of 80% bis-hydroxy-ethyl terephthalate is obtained.

Example 3

Example 1 is repeated using a 0.25 gram of ferric chloride ($FeCl_3$). After 11 hours 80% of the theoretical ammonia is removed, and a total yield of 76% bis-hydroxyethyl terephthalate is obtained.

Example 4

Example 1 is repeated using 0.3 gram stannous chloride. After 11 hours 97% of theoretical ammonia is removed and a total yield of 92% bis-hydroxy-ethyl terephthalate is obtained.

Example 5

Example 1 is repeated using 0.5 gram lead acetate. After 11 hours 100% of the theoretical ammonia is removed, and a total yield of 97% bis-hydroxy-ethyl terephthalate is obtained.

Example 6

Example 1 is repeated using 0.43 gram of lead chloride. After 7 hours 100% of the theoretical ammonia is removed, and a total yield of 98% bis-hydroxy-ethyl terephthalate is obtained.

Comparative Example A

By way of constrast, when Example 1 is repeated except that no catalyst is added, after 30 hours reaction time only 48% of the theoretical ammonia is evolved. When these results are compared with the results in the above examples, the outstanding advantages achieved through practice of the instant invention are evident.

What is claimed is:

1. In a process for the production of esters of aryl carboxylic acids from the corresponding nitriles wherein an aryl nitrile and a lower aliphatic polyhydric alcohol are reacted in the liquid phase and ammonia is removed, the improvement of carrying out the said reaction in the presence of a catalytic amount of an iron or tin compound, or elemental iron or tin, which, under the conditions of the reaction, will produce said iron or tin compound or mixtures thereof.

2. A process according to claim 1 wherein the catalyst is present in an amount of from about 0.01 to about 20 mol percent based on the aryl nitrile.

3. A process according to claim 2 wherein the catalyst is present in an amount of from about 0.5 to about 2 mol percent based on the aryl nitrile.

4. A process according to claim 1 wherein the molar ratio of aliphatic polyhydric alcohol to aryl nitrile is from about 2–50 to about 1.

5. A process according to claim 4 wherein said ratio is about 5–10 to about 1.

6. A process according to claim 1 wherein at least the theoretical amount of water is present.

7. A process according to claim 1 wherein terephthalonitrile is reacted with ethylene glycol to form bis-hydroxy-ethyl terephthalate.

8. A process according to claim 3 wherein from about 5–10 mols of the ethylene glycol are reacted with about 1 mol terephthalonitrile in the presence of a slight excess of water.

9. A process according to claim 8 wherein a water saturated stream of nitrogen is passed through the reaction mixture.

References Cited

UNITED STATES PATENTS

| | | | |
|---|---|---|---|
| 3,057,908 | 10/1962 | Gruschke et al. | 260—475 |
| 3,395,173 | 7/1968 | Oga et al. | 260—475 |

JAMES A. PATTEN, Primary Examiner

E. JANE SKELLY, Assistant Examiner

U.S. Cl. X.R.

260—469, 476